US005622561A

United States Patent [19]

Cummins et al.

[11] Patent Number: 5,622,561

[45] Date of Patent: Apr. 22, 1997

[54] PARTICULATE MATERIAL TREATMENT SYSTEM AND CONVEYOR BELT MIXING SYSTEM

[75] Inventors: David C. Cummins, Baton Rouge; David L. Roussel, Hester, both of La.

[73] Assignee: Kaiser Aluminum & Chemical Corporation, Pleasanton, Calif.

[21] Appl. No.: 506,176

[22] Filed: Jul. 25, 1995

Related U.S. Application Data

[63] Continuation of Ser. No. 184,532, Jan. 21, 1994, abandoned.

[51] Int. Cl.[6] .............................. B05B 13/02; B05C 5/00; B65G 47/22

[52] U.S. Cl. .......................... 118/303; 118/314; 118/324; 198/636; 198/599; 198/836.1; 134/126; 134/131

[58] Field of Search ............................. 118/19, 303, 324, 118/313, 314; 198/633, 636, 599, 836.1, 836.2, 836.3, 836.4; 134/126, 131; 366/349, 218

[56] References Cited

U.S. PATENT DOCUMENTS

| | | | |
|---|---|---|---|
| 1,065,448 | 6/1913 | Hollstein . | |
| 1,311,496 | 7/1919 | Castellini | 134/131 |
| 1,666,161 | 4/1928 | Birdsey | 198/633 |
| 2,389,650 | 11/1945 | Stephens . | |
| 2,537,005 | 1/1951 | Brown et al. | 198/38 |
| 2,579,562 | 12/1951 | Fruechtel | 198/43 |
| 2,590,051 | 3/1952 | Spain | 198/636 |
| 2,593,610 | 4/1952 | Roberts | 198/633 |
| 2,699,249 | 1/1955 | Milliken et al. | 198/84 |
| 2,989,170 | 6/1961 | Michaelson et al. | 198/836.1 |
| 3,024,893 | 3/1962 | Lambert | 198/836.1 |
| 3,096,212 | 7/1963 | Rosenleaf | 118/303 |
| 3,499,523 | 3/1970 | Clegg | 198/836.1 |
| 3,693,942 | 9/1972 | Foucault | 366/218 |
| 3,961,752 | 6/1976 | Doeksen | 118/303 |
| 4,436,446 | 3/1984 | Gordon | 198/836.1 |
| 4,783,952 | 11/1988 | Morellini | 198/636 |
| 5,149,502 | 9/1992 | Dablainville et al. | 198/636 |
| 5,201,404 | 4/1993 | Hurd et al. | 198/636 |

FOREIGN PATENT DOCUMENTS

| | | | |
|---|---|---|---|
| 55-89136 | 7/1980 | Japan | 134/131 |
| 1207933 | 1/1986 | U.S.S.R. | 198/636 |
| 2264276 | 8/1993 | United Kingdom | 198/836.1 |

*Primary Examiner*—Donald E. Czaja
*Assistant Examiner*—Steven P. Griffin
*Attorney, Agent, or Firm*—Gerald D. Haynes

[57] ABSTRACT

A system and a process is provided for reducing the dust formation during the transfer of a particulate material on an endless conveyor belt. During transfer of the material on the conveyor belt the material is first sprayed with a wetting agent then by application of a plow the moving material is lifted from the bottom of the belt and is diverted towards the side edges of the belt thus creating additional exposed surfaces. The material is then again sprayed then contacted with baffles to redirect the material from the side edges towards the center of the belt thus creating additional exposed surfaces which are then again sprayed with a wetting agent to substantially eliminate dusting. The plow and baffle combination can also be used for uniformly mixing two or more particulate materials on a moving belt.

6 Claims, 3 Drawing Sheets

PARTICULATE MATERIAL TREATMENT SYSTEM AND CONVEYOR BELT MIXING SYSTEM

This is a continuation of application Ser. No. 08/184,532, filed Jan. 21, 1994, now abandoned.

BACKGROUND OF THE INVENTION

During the transfer of many particulate materials, for example by means such as conveyor belts, considerable quantity of dust is generated which is unacceptable due to health and environmental hazards and also from a point of view of significant material losses. The known methods of wetting the surfaces of the material to be conveyed only partially eliminate dusting, since during the travel of the material, unwetted surfaces are continuously exposed resulting in further dusting. The present invention is directed to a system where during the travel of the dusty material the material is contacted with a dust controlling agent, for example water or an organic wetting agent, while the material being conveyed is simultaneously mixed or inverted through the application of a combination of plows and baffles located above the conveyor belt. The system of the invention not only significantly reduces the hazards associated with dusting, but also allows transport of dusty materials without encountering material losses. The system of the present invention can also be utilized to mix two or more nondusting particulate materials during conveying through the unique positioning of a combination of plows and baffles creating a material inverting system which is preferably located above the top surface of the conveyor belt.

SUMMARY OF THE INVENTION

The present invention relates to a system for the elimination of dusting during the transport of dusty materials on a conveyor belt and to the mixing of solid and liquid materials during conveying on a conveyor belt. More particularly, the present invention concerns the prevention of dust formation during the transport of dusty materials on conveyor belts by application of a wetting agent to the surface of the material being transported while utilizing a combination of plows or inverters and baffles or skirts arranged on the top of the belt in such a manner as to allow inverting of the material being conveyed and the mixing of the continuously inverted material with the wetting agent during its travel on the conveyor belt. Further, the present invention is also suitable for the mixing of two or more nondusting particulate materials on a conveyor belt during the travel of the materials by means of a system consisting of a combination of plows and baffles arranged on the top of the conveyor belt in a manner to allow inverting and thus mixing of the materials.

DETAILED DESCRIPTION OF THE INVENTION

The present invention relates to a system for the transfer of materials, especially dusting materials, on a conveyor belt. More particularly, the present invention relates to the prevention of dusting during the transfer of particulate materials on a conveyor belt. The purpose of the invention is achieved through the application of a wetting agent to the surface of the material being transferred and by the simultaneous provision of inverting means so arranged on the conveyor belt that the wetting agent and the particulate material are thoroughly mixed and thus dusting of the conveyed material is significantly reduced.

While the invention can be readily applied to the conveying of any particulate material which has dusting tendencies, for ready understanding of the principles of the invention, it will be described in detail with respect to the transfer of bauxite ore which is a material of known dusting propensity.

Bauxite is mined in many parts of the world and then the mined bauxite is usually shipped by ships or rail to facilities, such as Bayer process alumina plants, where the alumina content of the ore is extracted. The alumina plants usually operate continuously all year around and consequently large quantities of bauxite ore are needed to satisfy the continuous, uninterrupted supply of ore to the alumina plant. This requires large capacity storage areas which are generally equipped with conveying systems, such as conveyor belts, for the transfer the bauxite to the storage areas from the shipment receiving area, such as a dock, and also from the storage areas to the plant bauxite processing area. These transshipments of the bauxite ore can create serious dusting problems which are objectionable for both environmental and health reasons, apart from the aesthetic problems created by the deposition of the generally red-colored bauxite dust on a large area in and around the alumina processing plant. Thus, it is of major importance to significantly reduce dusting during the transfer of the bauxite ore, whether from the ship to the storage area, or from the storage area to the alumina processing facility.

In accordance with the invention, significant reduction of the dusting problems created by the transfer of bauxite ore is accomplished by the application of a wetting agent to the surface of the bauxite as it is being transferred on a conveyor belt while the bauxite is being continuously inverted on the belt by a combination of plows and baffles to expose unwetted surfaces which then are wetted by the wetting agent.

Figure 1:
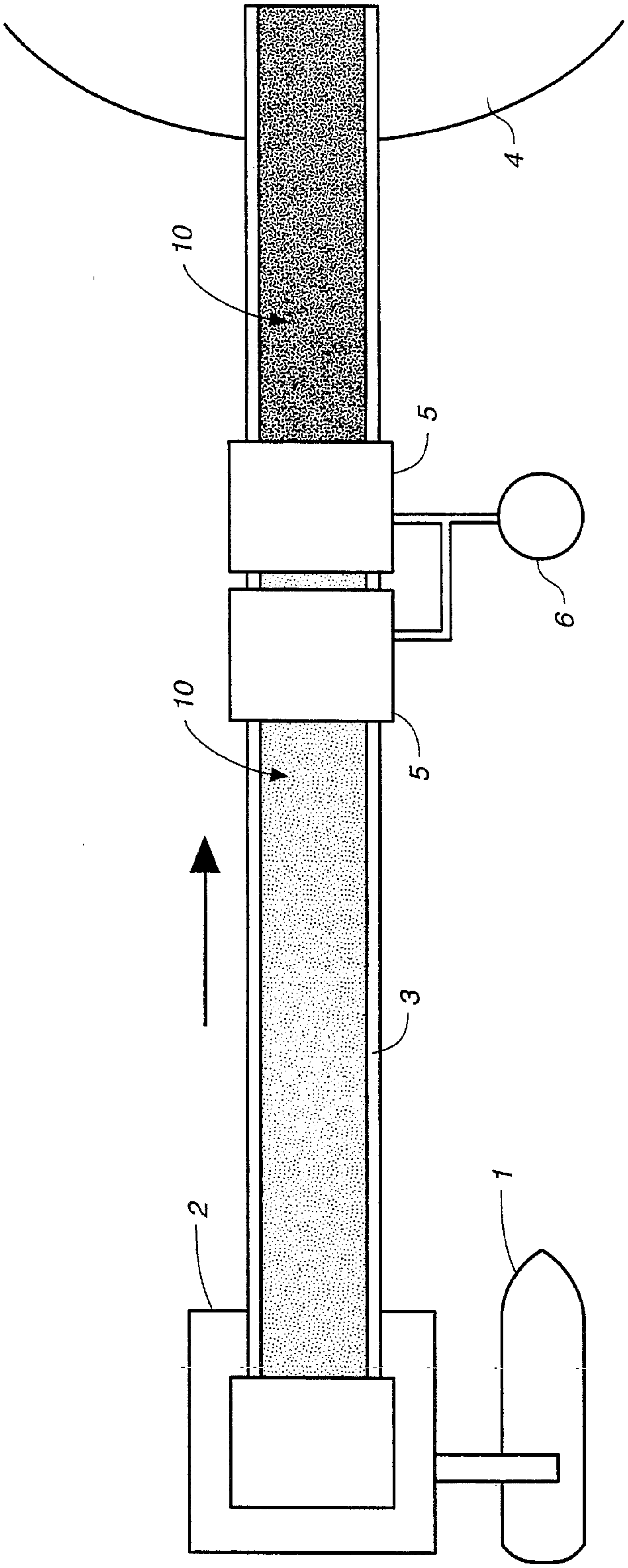
FIG. 1 is an overall schematic diagram of a bauxite unloading scheme wherein granular, dusty bauxite ore 10 is transferred from a ship 1 to storage area 4 by an endless belt conveyor 3. During transfer, the bauxite is sprayed via spraying systems 5 with a wetting agent supplied from tank 6.

FIG. 1 shows schematically the bauxite handling arrangement generally employed by alumina plants supplied with bauxite ore from ships or barges. The ship 1, containing the bauxite ore 10, is unloaded at the dock 2 and the unloaded bauxite is then transferred from the dock 2, to a covered storage area 4, typically by an endless belt-type conveyor system 3. At the dock, the unloaded bauxite is generally at an elevated position which allows the ready transfer of the ore to the storage area 4. The location of the covered storage area is generally away from the dock area and thus it is not unusual to have a 1000–2000 yard distance between the dock and storage area. Transfer of the bauxite ore from the dock to the storage area over this long distance generates dust and additional dust is created by the discharge of the ore from the belt to the storage area. In order to significantly reduce the dust generation, a wetting agent is applied to the ore, as it travels from dock 2 to storage area 4 by using wetting stations 5 supplied with a wetting agent from tank 6.

Wetting or dust elimination agents usable for the purposes of the present invention include water and/or organic surface active or wetting agents. The type of dust eliminating or wetting agent employed depends on the nature of the material to be conveyed. Thus, if the material to be conveyed reacts with water, for example undergoes hydration by contact with water, then the use of water as a dust elimination agent is not recommended and the use of an organic surface active or wetting agent is recommended. Organic surface active agents, utilized for the treatment of particulate materials for the elimination of dust formation, are well-known and commercially available. They may be water-soluble or insoluble in water and their selection is generally dependent on the material to be treated. Typical examples include soaps, fatty acids, copolymers of acrylic acids and similar well-known organic polymeric compounds.

Application of the wetting agent alone was found to only partially eliminate the dusting problem, since the wetting agent only adheres to the top surface of the ore. During travel on the conveyor belt additional ore surfaces are exposed and these additional ore surfaces are not wetted and are prone to dust. Application of excessive wetting agent to the exposed surfaces is not practical from several points of view. If water is used as the wetting agent, then excessive water added to the bauxite may either compact the bauxite to lumps which will hinder subsequent transfers and processing of the ore or convert the bauxite surfaces to an unacceptably sticky condition which will cause the ore to adhere to the surfaces of the conveyor belt and instead of the wetted ore being discharged at the storage area, it will continue to travel on the underside of the belt and will be discharged at an undesired location. If an organic wetting agent is used as a dust control agent, then the costs of adding additional quantities of such organic wetting agent may become prohibitive apart from the fact that addition of organic materials to the bauxite may cause undesired contamination of the Bayer process liquors. Large quantities of organic compounds present on the surfaces of other treated materials may cause processing problems or undesired contamination.

Figure 2:
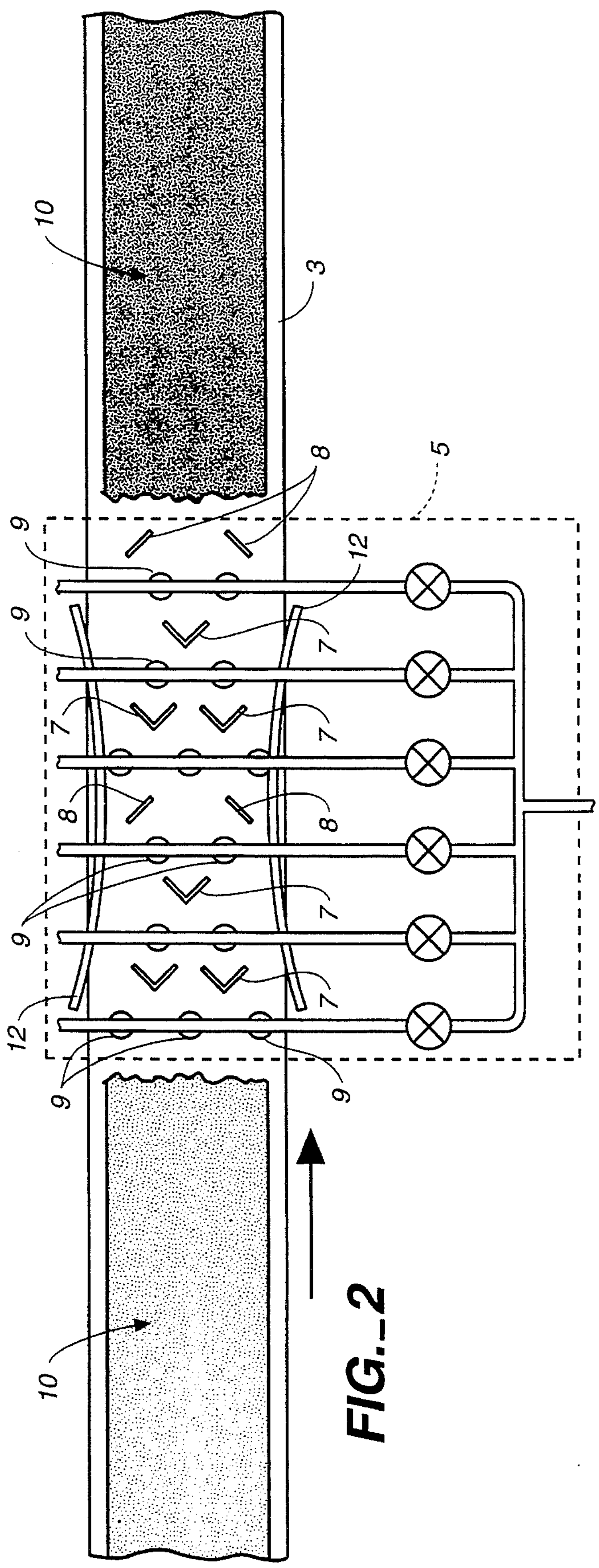
FIG. 2 is a top plan view of an assembly of plows 7, baffles 8 and spray heads 9.
Figure 3:
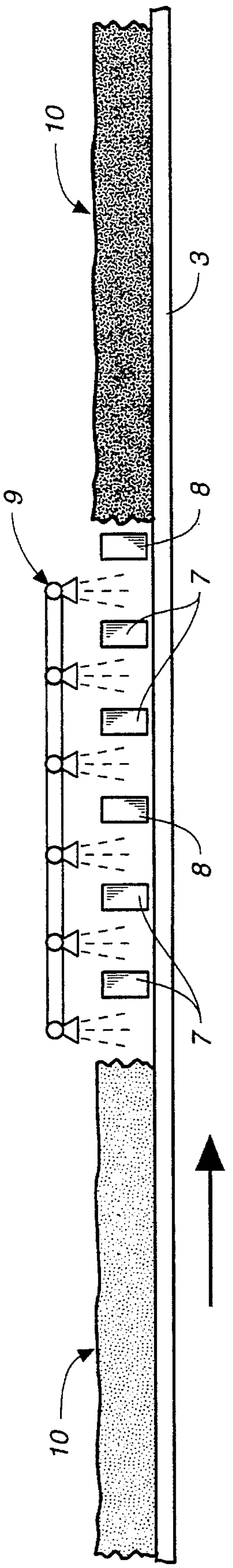
FIG. 3 is a side elevational view of the assembly showing the positioning of plows 7 the spray heads 9 over the belt 3.
Figure 4:
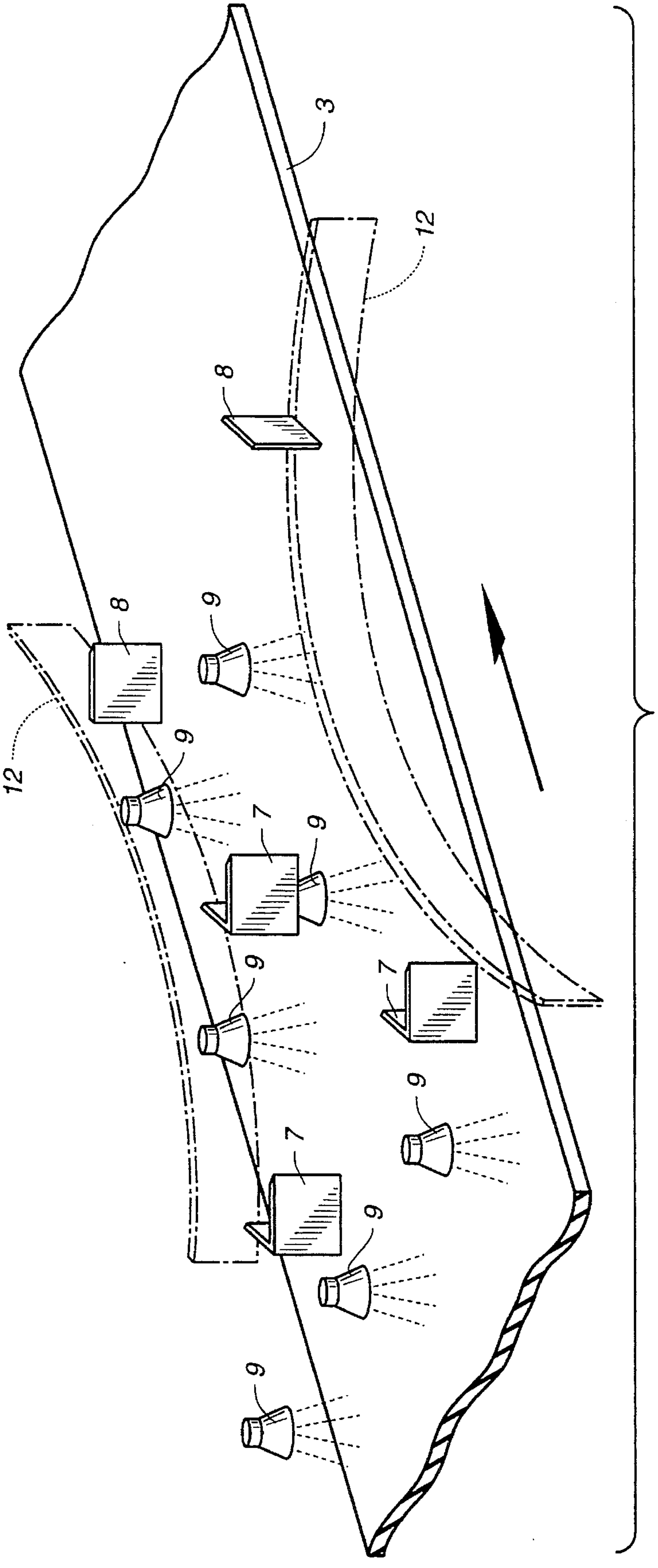
FIG. 4 is a perspective view of the front portion of an assembly with skirts 12 shown in dashed lines.

To avoid the aforementioned problems, the present invention employs, together with the wetting of the ore surfaces, a series of plows 7 and baffles 8 and skirts 12 located above the upper surface of an endless conveyor belt 3. The assembly or combination of the plows or blades 7 with the baffles 8 and skirts 12 is static in relationship to the movement of the conveyor belt 3 and the arrangement of these elements of the mixing or inverting device of the instant invention are shown in FIGS. 2 and 3. The plows or blades 7 employed face the direction of travel as can be observed in FIG. 2. The number of plows 7 positioned across across the width of a conveyor belt depends on the width of the conveyor belt and also, to a degree, on the size of the material to be conveyed. For example, if the width of the belt is less than about 30 inches, then the use of one plow across the width of the belt will suffice, provided the size of the material to be conveyed is in the approximate size range from about minus 325 mesh to about 2 inches. For wider conveyor belts, positioning of more than one plow across the width of the belt is recommended. Generally, baffles are placed in staggered relationship with respect to the row of plows employed. It is also possible to vary the number of plows in alternating rows of plows. By using the potential energy generated from the velocity of the moving belt, the plow contacts or digs material from the bottom portion of the belt and diverts this material upward and outward toward the edge portion of the conveyor belt. The outwardly moving material then contacts the skirts 12 arranged at the outer edges of the conveyor belt in a position as shown in FIGS. 2 and 4, the skirts 12 have a inward convex shape as shown in FIGS. 2 and 4. The contact of the material with the shaped skirts 12 directs the material away from the outer edges of the conveyor belt towards the center of the belt to create a converging zone 13 of the material between the skirts. The plows 7 and baffles 8 are generally positioned between the skirts within the converging zone 13 as shown in FIG. 2 and 4. The contact of the material with the baffles divert the material towards the center of the conveyor belt while exposing additional material surface area for contact with the wetting agent. The number of plow-baffle sets employed on the conveyor belt is selected to obtain uniform mixing between the material and the wetting agent. It was found that for achieving acceptable dust reduction in the conveying of bauxite particles, at least two spaced plow-baffle sets should be employed.

The application of the wetting agent to the surface of the material to be conveyed is generally accomplished by the use of spray heads 9 arranged across the width of the conveyor belt. The number of spray heads 9 employed across the width of the belt depends on the width of the belt. A suitable arrangement for providing a uniform spray across the width of the belt, employs a spray bar equipped with perforations. The number of spray heads or the number of perforations in the spray bar is selected in such a manner as to allow uniform distribution of the wetting agent across the width of the belt. The number of spray sets employed for the wetting of the travelling material depends on the number of plow-baffle combinations utilized for mixing and inverting the material. Thus, if two spaced sets of plow-baffle combinations are utilized then, for best results, four spray bars should be used. Each spray bar should preferably be located above the individual components of the plow-baffle sets. Thus, for satisfactory wetting agent distribution one spray bar or several spray heads should be placed above each row of plows and baffles. The direction of the sprays are so controlled that the sprays contact only the material being conveyed but not the belt. The quantity of wetting agent applied through the spray heads or spray bars can be manual or automatic, with a shut-off system provided to avoid spraying when there are no particulate materials on the belt.

It has been found that by applying the novel dust reduction system to the transfer of bauxite ore particles from the dock to the storage area and from the storage area to the bauxite ore processing area, overall reduction of dust formation up to about 65% can be readily achieved. As also mentioned above, the novel system of the invention not only provides significant dust reduction, but also results in considerable material savings. It has been found that by reducing dust formation through the use of the novel system consisting of wetting of the surface of the material being conveyed with simultaneous application of the plow-baffle mixing concept, substantial quantities of material can be saved which otherwise would have been lost through dusting. The material so saved can amount to significant quantities resulting in substantial savings and rapid repayment of the capital investment cost incurred in the construction of the dust reduction system of the present invention.

In an additional embodiment of the present invention uniform mixing of two or more particulate materials can be achieved during transfer from one location to another. For example, if two different solid materials, which are stored in different storage areas, are to be mixed and then either stored again or immediately processed, the mixing/inverting system of the instant invention can be readily utilized to provide a substantially uniform mixture of the two solid materials during transport on a conveyor belt. Thus, the use of a separate mixing vessel can be avoided and the mixing operation can be easily accomplished.

As an example, the mixing/inverting system of the present invention was utilized in obtaining an intimate mixture of bauxite ore and lime to be charged to a Bayer process. The bauxite ore was conveyed from the bauxite storage area on a conveyor belt and a wetting agent was added through spray bars to the ore while the ore was simultaneously subjected to mixing and inverting through the use of the novel system. At a point removed from the last spray bar, a second conveyor belt was utilized to feed particulate lime stone to the belt conveying the bauxite ore. The mixture of bauxite ore and lime stone were then subjected to the mixing-inverting operation of the invention by applying several plow-baffle combinations which were positioned spaced apart from each other to allow effective mixing and the generation of a uniform bauxite ore-lime stone mixture. The uniformity of the mixture was such that it allowed the direct charging of the mixture to the Bayer process without any additional mixing requirement.

It is to be understood that the plows and the baffles employed in the present invention are generally suspended above the conveyor belt by means which allow the usual movement of the belt and which means are arranged in a known manner so that they do not interfere with the transfer of the materials. It is however also possible to make both the plows and baffles an integral part of the belt by attaching these to the conveyor belt. Variations, where either the plows or the baffles form a part of the conveyor belt can also be utilized. The choice between these methods remains entirely within the discretion of the user of the system.

What is claimed is:

1. A material treatment system for significantly reducing dust formation during transfer of particulate material having a tendency of dusting, the system comprising:

(a) an endless conveyor belt for conveying the particulate material;

(b) material spraying means located above the endless conveyor belt across the width of the belt, the spraying means being adapted to spray water or organic surface active agents onto the surface of the particulate material conveyed on the belt in order to wet the surface of the particulate material being conveyed; and (c) material mixing means located above the surface of the belt and positioned past the spraying means in relation to the direction of travel of the belt, the mixing means including (i) a pair of skirts, positioned above the belt surface on each side of the belt to direct the conveyed particulate material away from the sides and towards the center of the belt so as to create a converging zone of the particulate material between the skirts;

(ii) at least one plow, having a pointed end and a flared end, located above the surface of the belt between the skirts within the converging zone, the at least one plow being positioned in a manner so that the pointed end of the at least one plow points in a direction opposite the direction of travel of the belt to allow the at least one plow to lift and divert the wetted particulate material being conveyed on the belt towards side edges of the belt to expose additional unwetted material surfaces, (iii) two or more baffle means located above the belt surface on each side of the belt between the skirts within the converging zone, past the at least one plow in relation to the direction of travel of the belt, the baffle means being positioned at such an angle as to redirect the conveyed particulate material away from the sides and towards the center of the belt while exposing additional unwetted surfaces of the particulate material, and (iv) a pair of plows, each plow having a pointed end and a flared end, located above the surface of the belt between the skirts within the converging zone, past the baffle means in relation to the direction of travel of the belt, the pair of plows being positioned in a manner so that the pointed end of the plows point in a direction opposite the direction of travel of the belt to allow each plow to lift and divert wetted material being conveyed towards the side edges of the belt to expose additional unwetted material surfaces.

2. The system of claim 1 wherein the spraying means are positioned between the plow and baffle means.

3. The system of claim 1 wherein in the material treatment system the at least on plow, the pair of plows, and the baffle means are arranged in a staggered manner.

4. The system of claim 1 wherein the spraying means is a perforated spray bar.

5. A material treatment system for significantly reducing dust formation during transfer of particulate material having a tendency of dusting, the system comprising:

(a) an endless conveyor belt for conveying the particulate material;

(b) material spraying means located above the endless conveyor belt across the width of the belt, the spraying means being adapted to spray water or organic surface active agents onto the surface of the particulate material conveyed on the belt in order to wet the surface of the particulate material being conveyed; and, (c) a plurality of inverting means, spaced along the endless conveyor, each inverting means including material mixing means located above the surface of the belt and positioned past the spraying means in relation to the direction of travel of the belt, the mixing means including;

(i) a pair of skirts, positioned above the belt surface on each side of the belt to direct the conveyed particulate material away from the sides and towards the center of the belt so as to create a converging zone of the particulate material between the skirts;

(ii) at least one plow, having a pointed end and a flared end, located above the surface of the belt between the skirts within the converging zone, the at least one plow being positioned in a manner so that the pointed end of the at least one plow points in a direction opposite the direction of travel of the belt to allow the at least one plow to lift and divert the wetted material being conveyed on the belt towards side edges of the belt to expose additional unwetted particulate material surfaces, and (iii) two or more baffle means located above the belt surface on each side of the belt between the skirts within the converging zone, past the plow in relation to the direction of travel of the belt, the baffle means being positioned at such an angle as to redirect the conveyed particulate material away from the sides and towards the center of the belt while exposing additional unwetted surfaces of the particulate material.

6. A material treatment system for significantly reducing dust formation during transfer of particulate material having a tendency of dusting, the system comprising:

(a) an endless conveyer belt for conveying the particulate material;

(b) material spraying means located above the endless conveyer belt across the width of the belt, the spraying means being adapted to spray water or organic surface active agents onto the surface of the particulate material conveyed on the belt in order to wet the surface of the particulate material being conveyed; and (c) material mixing means located above the surface of the belt and positioned past the spraying means in relation to the direction of travel of the belt, the mixing means including (i) a pair of skirts, positioned above the belt surface on each side of the belt to direct the conveyed particulate material away from the sides and towards the center of the belt so as to create a converging zone of the particulate material between the skirts;

ii) at least one plow, having a pointed end and a flared end, located above the surface of the belt between the skirts within the converging zone, the at least one plow being positioned in a manner so that the pointed end of the at least one plow points in a direction opposite the direction of travel of the belt to allow the at least one plow to lift and divert the wetted particulate material being conveyed on the belt towards side edges of the belt to expose additional unwetted particulate material surfaces, and (iii) two or more baffle means located above the belt surface on each side of the belt between the skirts within the converging zone, past the at least one plow in relation to the direction of travel of the belt, the baffle means being positioned on each side of the belt at such an angle as to redirect the conveyed particulate material away from the sides and towards the center of the belt while exposing additional unwetted surfaces of the particulate material.

* * * * *